(12) United States Patent
Davis et al.

(10) Patent No.: US 8,115,359 B2
(45) Date of Patent: Feb. 14, 2012

(54) MODULAR LIFE EXTENSION KIT FOR A WIND TURBINE GENERATOR SUPPORT FRAME

(75) Inventors: John P. Davis, Greer, SC (US); James Antalek, Schenectady, NY (US); Chad Robert Conrad, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 12/640,850

(22) Filed: Dec. 17, 2009

(65) Prior Publication Data

US 2011/0133588 A1     Jun. 9, 2011

(51) Int. Cl.
*H02K 5/00* (2006.01)
(52) U.S. Cl. .......................................... 310/91
(58) Field of Classification Search .................... 310/91, 310/89; 290/44, 55, 54
See application file for complete search history.

(56) References Cited

U.S. PATENT DOCUMENTS

| | | | |
|---|---|---|---|
| 5,744,885 A | 4/1998 | Keck et al. | |
| 6,088,904 A | 7/2000 | Keck et al. | |
| 6,357,549 B1 | 3/2002 | Brennan et al. | |
| 6,505,785 B2 | 1/2003 | Willis et al. | |
| 6,614,125 B2 | 9/2003 | Willis et al. | |
| 6,857,508 B2 | 2/2005 | Miller et al. | |
| 7,895,744 B2* | 3/2011 | Numajiri | 29/889.1 |
| 2004/0025466 A1 | 2/2004 | Hink et al. | |
| 2008/0258468 A1* | 10/2008 | Fuller | 290/55 |
| 2008/0309086 A1* | 12/2008 | Takaichi et al. | 290/52 |
| 2009/0224555 A1 | 9/2009 | Zhencai | |
| 2010/0314872 A1* | 12/2010 | Wagoner et al. | 290/44 |

* cited by examiner

*Primary Examiner* — Nguyen N Hanh
(74) *Attorney, Agent, or Firm* — James McGinness, Esq.; Armstrong Teasdale LLP

(57) ABSTRACT

A modular life extension kit is configured to extend a useful life of a support frame for a wind turbine generator. The support frame includes a support member coupled to a support cross-member. The support member has a first length, and the support cross-member has a second length. The modular life extension kit includes a plurality of plates configured to be coupled to the support frame. At least a first plate of the plurality of plates has a first side configured to be coupled to the support member and a second side configured to be coupled to the support cross-member. The first side extends at least five percent of the first length and the second side extends at least five percent of the second length.

20 Claims, 4 Drawing Sheets

MODULAR LIFE EXTENSION KIT FOR A WIND TURBINE GENERATOR SUPPORT FRAME

BACKGROUND OF THE INVENTION

The subject matter described herein relates generally to wind turbines and, more particularly, to a life extension kit for a wind turbine generator support frame.

Wind turbines have been receiving increased attention for being environmentally safe and relatively inexpensive alternative energy sources. With the growing interest in alternative energy sources, considerable efforts have been made to develop wind turbines that are reliable, efficient, and cost effective.

Some known wind turbines include a generator support frame including a main frame or a "bedplate" and a generator support frame or a "rear frame" portion that is cantilevered from the bedplate. Known generator support frames may be subjected to stresses including dynamic loading that may cause fatigue cracking and/or failure.

BRIEF SUMMARY OF THE INVENTION

In one aspect, a method is provided for installing a modular life extension kit onto a support frame for a wind turbine generator. The support frame includes a support member coupled to a support cross-member. The support member has a first length, and the support cross-member has a second length. The method includes providing a plurality of plates configured to be coupled to the support frame. At least a first plate of the plurality of plates has a first side extending at least five percent of the first length and a second side extending at least five percent of the second length. The first side is aligned with the support member and the second side with the support cross-member. The first plate is coupled to the support frame along the first side and the second side.

In another aspect, a modular life extension kit is provided for use with a support frame for a wind turbine generator. The support frame includes at least a support member coupled to a support cross-member. The support member has a first length and the support cross-member has a second length. The modular life extension kit includes a plurality of plates configured to be coupled to the support frame. At least a first plate of the plurality of plates has a first side configured to be coupled to the support member and a second side configured to be coupled to the support cross-member. The first side extends at least five percent of the first length and the second side extends at least five percent of the second length.

In yet another aspect, a support system is provided for a wind turbine generator. The support system includes a generator support frame and a modular life extension kit. The generator support frame includes at least a support member and a support cross-member coupled to the support member. The support member has a first length and the support cross-member has a second length. The modular life extension kit includes a plurality of plates configured to be coupled to the generator support frame. At least a first plate of the plurality of plates has a first side configured to be coupled to the support member and a second side configured to be coupled to the support cross-member. The first side extends at least five percent of the first length and the second side extends at least five percent of the second length.

DETAILED DESCRIPTION OF THE INVENTION

The methods and systems described herein relate to a life extension kit that is configured to extend a useful life of a wind turbine generator support frame. The life extension kit is configured to provide structural support to the wind turbine generator support frame. Moreover, the life extension kit is configured to provide an alternate load path for the wind turbine generator support frame, which reduces stress at weld joints and thus reduces occurrence of "crack" indication and/or propagation.

Figure 1:
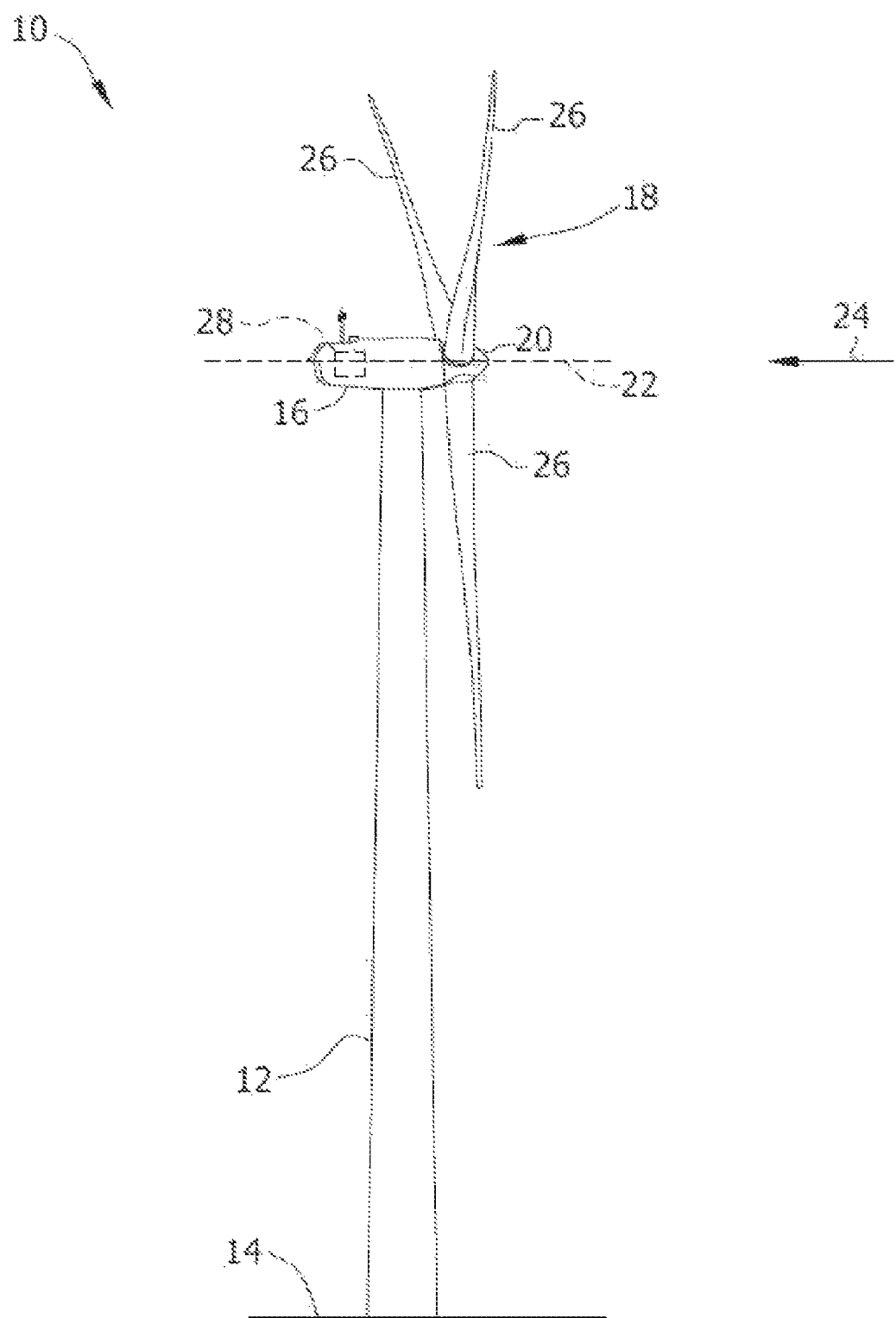
FIG. 1 is a perspective view of an exemplary wind turbine.

FIG. 1 is a perspective view of an exemplary wind turbine 10. Wind turbine 10 is a wind turbine generator used for generating electrical power from wind energy. As used herein, the term "wind turbine generator" is intended to be representative of any wind turbine that generates electrical power from rotational energy generated from wind energy, and more specifically, converts mechanical energy converted from kinetic energy of wind to electrical power.

In the exemplary embodiment, wind turbine 10 includes a tower 12 that extends from a supporting surface 14, a nacelle 16 mounted on tower 12, and a rotor 18 that is coupled to nacelle 16. Tower 12 is fabricated from any suitable material. In the exemplary embodiment, tower 12 is fabricated from rolled plate steel. Tower 12 has any suitable height that enables wind turbine 10 to function as described herein.

Rotor 18 includes a hub 20 rotatable about an axis of rotation 22. Rotor 18 is positionable at any suitable angle with respect to a direction 24 of the wind to harness wind energy. In the exemplary embodiment, as wind strikes rotor blades 26 from direction 24, rotor 18 is rotated about axis of rotation 22.

Rotor 18 includes any suitable number of rotor blades 26 coupled to and extending outwardly from hub 20. In the exemplary embodiment, rotor 18 includes three rotor blades 26. As used herein, the term "blade" is intended to be representative of any device that provides a reactive force when in motion relative to a surrounding fluid. Rotor blades 26 are spaced about hub 20 to facilitate rotating rotor 18 to enable kinetic energy to be transferred from the wind into usable mechanical energy, and subsequently, electrical energy. Loads induced to rotor blades 26 are transferred to hub 20.

A control system 28 is communicatively coupled to a plurality of the components of wind turbine 10 for generally monitoring and controlling operation of wind turbine 10 and/or some or all of the components thereof. Control system 28 may be used to monitor and control the overall system including, without limitation, pitch and speed regulation, high-speed shaft and yaw brake application, yaw and pump motor application, fault monitoring and/or acoustic emission regulation, for example.

Figure 2:
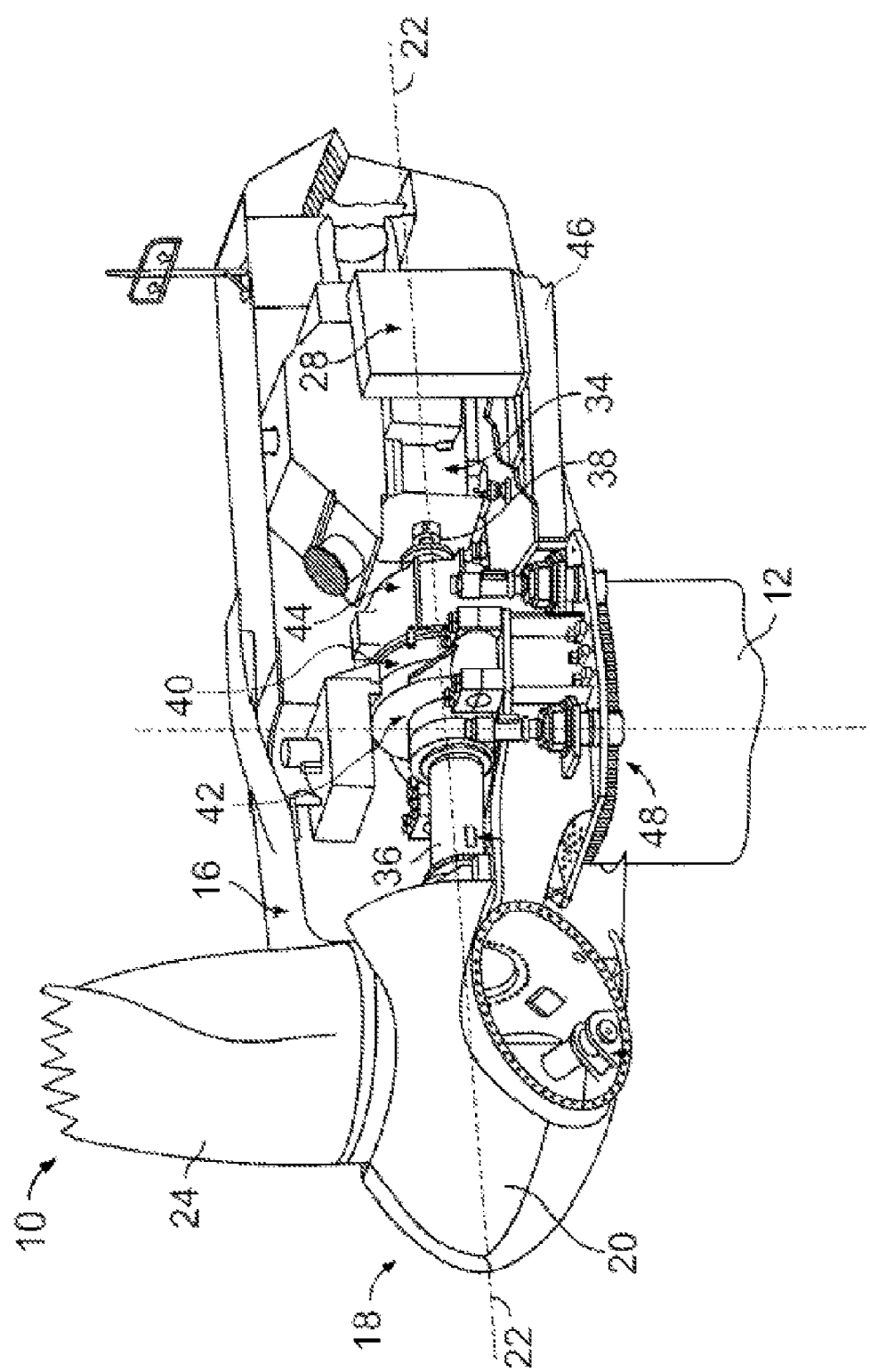
FIG. 2 is a perspective sectional view of an exemplary nacelle including an exemplary generator support frame suitable for use with the wind turbine shown in FIG. 1.

FIG. 2 is a perspective sectional view of nacelle 16. In the exemplary embodiment, wind turbine 10 includes an electrical generator 34 coupled to rotor 18 for generating electrical power from the rotational energy generated by rotor 18. In the exemplary embodiment, a rotor shaft 36 is coupled to hub 20 for rotation therewith. In the exemplary embodiment, a generator rotor shaft 38 is rotatably coupled to rotor shaft 36 through a gearbox 40. More specifically, in the exemplary embodiment, gearbox 40 has a low speed side 42 rotatably coupled to rotor shaft 36 and a high-speed side 44 rotatably coupled to generator rotor shaft 38. In the exemplary embodiment, a generator support frame 46 provides a framework within nacelle 16 to support electrical generator 34. In the exemplary embodiment, generator support frame 46 includes a plurality of beams coupled at joints with suitable welds (shown in FIG. 3).

Figure 3:
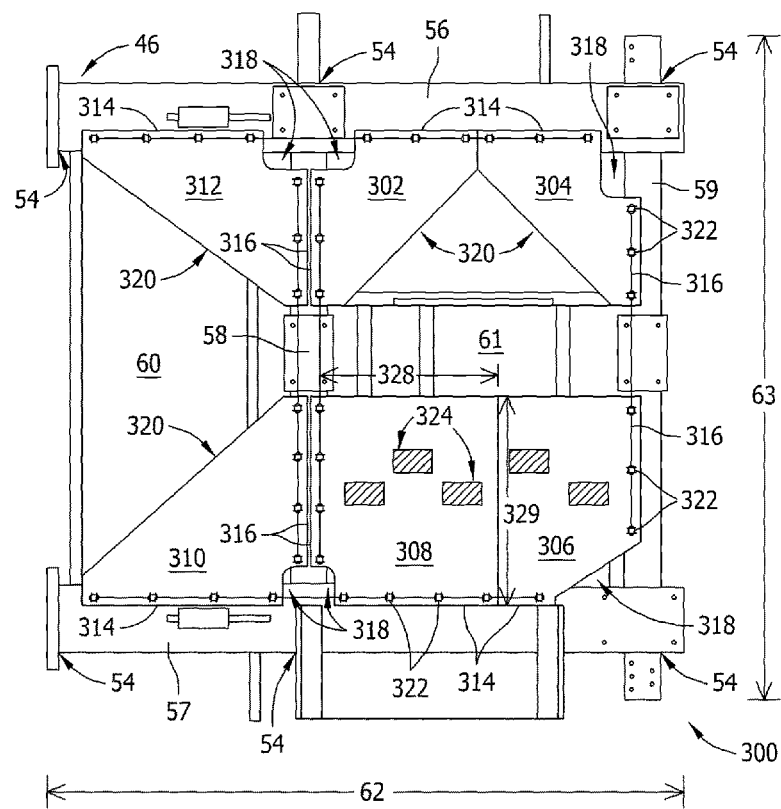
FIG. 3 is a top view of an exemplary life extension kit including a plurality of exemplary plates suitable for use with the generator support frame.

FIG. 3 is a top view of a portion of generator support frame 46. In the exemplary embodiment, generator support frame 46 includes a plurality of support beams that are coupled at a plurality of joints 54 via a plurality of suitable welds and/or coupling mechanisms. In the exemplary embodiment, the plurality of support beams includes at least one support member 56 and at least one support cross-member 58 that is substantially perpendicular to support member 56. More specifically, in the exemplary embodiment, the plurality of support beams includes a first support member 56, a second support member 57, and a first support cross-member 58 and a second support cross-member 59 each extending between first support member 56 and second support member 57. In the exemplary embodiment, first and second support members 56 and 57 are substantially similar, and first and second support cross-members 58 and 59 are substantially similar. First and second support members 56 and 57 are described generally herein as support member 56, and first and second support cross-members 58 and 59 are described generally herein as support cross-member 58.

Each support member 56 has a first length 62, and each support cross-member 58 has a second length 63. In the exemplary embodiment, first length 62 is about 2800 mm, and second length 63 is about 2220 mm. In the exemplary embodiment, generator support frame 46 has a frame area defined by first length 62 and second length 63. In the exemplary embodiment, the frame area includes at least one opening 60 defined between the inner edges of each support member 56. More specifically, in the exemplary embodiment, a first opening 60 is defined by first and second support members 56 and 57 and first cross-member 58, and a second opening 61 is defined by first and second support members 56 and 57 and first and second support cross-members 58 and 59. Openings 60 and 61 are described generally herein as opening 60.

A modular life extension kit 300 is coupled to at least a portion of generator support frame 46 and, more specifically, to generator support frame 46. In the exemplary embodiment, life extension kit 300 includes a first plate 302, a second plate 304, a third plate 306, a fourth plate 308, a fifth plate 310, and a sixth plate 312 that are configured to extend across at least a portion of opening 60 defined by support members 56 and support cross-members 58. In the exemplary embodiment, life extension kit 300 extends across at least twenty percent of opening 60. More specifically, life extension kit 300 extends across at least thirty percent of opening 60. Even more specifically, life extension kit 300 extends across at least forty percent of opening 60.

In the exemplary embodiment, first, second, third, and fourth plates 302, 304, 306, and 308 are configured to extend across at least a portion of second opening 61, and fifth and sixth plates 310 and 312 are configured to extend across at least a portion of first opening 60.

In the exemplary embodiment, first plate 302, second plate 304, third plate 306, fourth plate 308, fifth plate 310, and/or sixth plate 312 have suitable configurations to fit a corresponding portion of generator support frame 46 and/or other components housed within nacelle 16. More specifically, in the exemplary embodiment, each of first plate 302, second plate 304, fifth plate 310, and sixth plate 312 has a shape that is generally triangular, and each of third plate 306 and fourth plate 308 has a shape that is generally rectangular.

In the exemplary embodiment, first plate 302, second plate 304, third plate 306, fourth plate 308, fifth plate 310, and/or sixth plate 312 each has a first side 314 coupled to a first portion of generator support frame 46 and a second side 316 coupled to a second portion of generator support frame 46. In the exemplary embodiment, first side 314 has a length 328 and second side 316 has a width 329 described in further detail below.

In the exemplary embodiment, first side 314 is substantially perpendicular to second side 316. As such, in the exemplary embodiment, a corner of each of first plate 302, second plate 304, third plate 306, fourth plate 308, fifth plate 310, and/or sixth plate 312 formed by first side 314 and second side 316 has an angle of about 90 degrees. In the exemplary embodiment, first side 314 is configured to be coupled to support member 56 and second side 316 is configured to be coupled to support cross-member 58. More specifically, in the exemplary embodiment, first sides 314 of first, second, and sixth plates 302, 304, and 312 are configured to be coupled to first support member 56, and first sides 314 of third, fourth, and fifth plates 306, 308, and 310 are configured to be coupled to second support member 57. Moreover, in the exemplary embodiment, second sides 316 of first, fourth, fifth, and sixth plates 302, 308, 310, and 312 are configured to be coupled to first support cross-member 58, and second sides 316 of second and third plates 304 and 306 are configured to be coupled to second support cross-member 59.

In the exemplary embodiment, each of first plate 302, second plate 304, third plate 306, fourth plate 308, fifth plate 310, and/or sixth plate 312 has at least one of a first cutout 318 and a second cutout 320. In the exemplary embodiment, first cutout 318 is positioned at a first corner, and second cutout 320 is positioned at a second corner that is opposite the first corner. More specifically, in the exemplary embodiment, first cutout 318 is positioned at the corner of plate 301 formed by first side 314 and second side 316.

First cutout 318 has any suitable shape and size to enable visual inspection of a portion of generator support frame 46. For example, first cutout 318 may be configured to enable joint 54 to be visually inspected. In the exemplary embodiment, first plate 302, second plate 304, fourth plate 308, fifth plate 310, and sixth plate 312 each has first cutout 318 having a shape that is generally rectangular and third plate 306 has first cutout 318 having a shape that is generally triangular.

Second cutout 320 has any suitable shape and size to receive at least a portion of a component coupled to electrical generator 34 and/or at least a portion of electrical generator 34. For example, second cutout 320 may be configured to receive at least a portion of another component housed within nacelle 16. In the exemplary embodiment, first plate 302, second plate 304, fifth plate 310, and sixth plate 312 each has second cutout 320 having a shape that is substantially triangular. More specifically, in the exemplary embodiment, fifth plate 310 and sixth plate 312 each has second cutout 320 configured to receive at least a portion of electrical generator 34.

In the exemplary embodiment, a plurality of openings 322 are defined through first plate 302, second plate 304, third plate 306, fourth plate 308, fifth plate 310, and/or sixth plate 312 along first side 314 and along second side 316. Each opening 322 is configured to receive a suitable coupling mechanism to couple first plate 302, second plate 304, third plate 306, fourth plate 308, fifth plate 310, and/or sixth plate 312 to generator support frame 46. In the exemplary embodiment, each opening 322 is configured to receive a bolt. Alternatively, first plate 302, second plate 304, third plate 306, fourth plate 308, fifth plate 310, and/or sixth plate 312 may be coupled to generator support frame 46 using any suitable coupling mechanism including, without limitation, a clamp and/or a weld.

In the exemplary embodiment, first, second, third, fourth, fifth, and sixth plates 302, 304, 306, 308, 310, and 312 have a surface area that extends across a portion of the frame area to enable a person to walk on life extension kit 300. In the exemplary embodiment, at least a portion of at least one plate 302, 304, 306, 308, 310, and/or 312 includes a non-slip surface 324. More specifically, at least one plate 302, 304, 306, 308, 310, and/or 312 includes a top surface including a non-slip surface 324 to enable a person to safely walk on life extension kit 300. Moreover, in the exemplary embodiment, the generally rectangular shape of third plate 306 and fourth plate 308 serves as a walkway that enables a person to walk on life extension kit 300.

Figure 4:
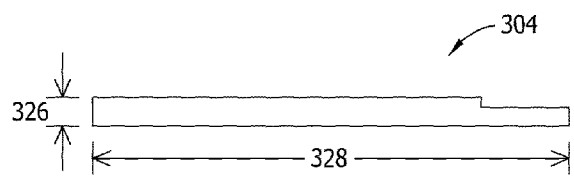
FIG. 4 is a side view of one of the plates shown in FIG. 3.

In the exemplary embodiment, each of first plate 302, second plate 304, third plate 306, fourth plate 308, fifth plate 310, and/or sixth plate 312 has a thickness 326 (shown in FIG. 4), length 328 along first side 314, and width 329 (shown in FIG. 3) along second side 316. In the exemplary embodiment, length 328 of first plate 302, second plate 304, third plate 306, fourth plate 308, fifth plate 310, and/or sixth plate 312 extends at least five percent of first length 62 of support member 56 and width 329 of first plate 302, second plate 304, third plate 306, fourth plate 308, fifth plate 310, and/or sixth plate 312 extends at least five percent of second length 59 of support cross-member 58. More specifically, in the exemplary embodiment, length 328 of first plate 302, second plate 304, third plate 306, fourth plate 308, fifth plate 310, and/or sixth plate 312 extends at least ten percent of first length 62 and width 329 of first plate 302, second plate 304, third plate 306, fourth plate 308, fifth plate 310, and/or sixth plate 312 extends at least fifteen percent of second length 59. Even more specifically, length 328 of plate 310 extends at least twenty percent of first length 62 and width 329 of first plate 302, second plate 304, third plate 306, fourth plate 308 fifth plate 310 and/or sixth plate 312 extends at least thirty percent of second length 59. In the exemplary embodiment, at least one of length 328 along first side 314 and width 329 along second side 316 is substantially greater than thickness 326. More specifically, in the exemplary embodiment, both length 328 of first side 314 and width 329 of second side 316 is substantially greater than thickness 326. In the exemplary embodiment, thickness 326 is between about 10.0 mm to about 16.0 millimeters (mm), and length 328 and width 329 are between about 150.0 mm to about 1500.0 mm. More specifically, thickness 326 is between about 12.5 mm and about 13.0 mm, and length 328 and width 329 are between about 240.0 mm and about 1020.0 mm.

In the exemplary embodiment, first plate 302, second plate 304, third plate 306, fourth plate 308, fifth plate 310, and/or sixth plate 312 has a suitable weight. In the exemplary embodiment, first plate 302, second plate 304, third plate 306, fourth plate 308, fifth plate 310, and/or sixth plate 312 has a weight up to about 250 pounds (lbs). More specifically, in the exemplary embodiment, first plate 302, second plate 304, third plate 306, fourth plate 308, fifth plate 310, and/or sixth plate 312 has a weight between about 70 lbs. to about 175 lbs.

In the exemplary embodiment, first plate 302, second plate 304, third plate 306, fourth plate 308, fifth plate 310, and/or sixth plate 312 is fabricated from a suitable material. In the exemplary embodiment, first plate 302, second plate 304, third plate 306, fourth plate 308, fifth plate 310, and/or sixth plate 312 is fabricated from at least one of a stainless steel, a carbon steel coated with zinc spray coating, and a carbon steel with hot dip galvanized coating.

Figure 5:
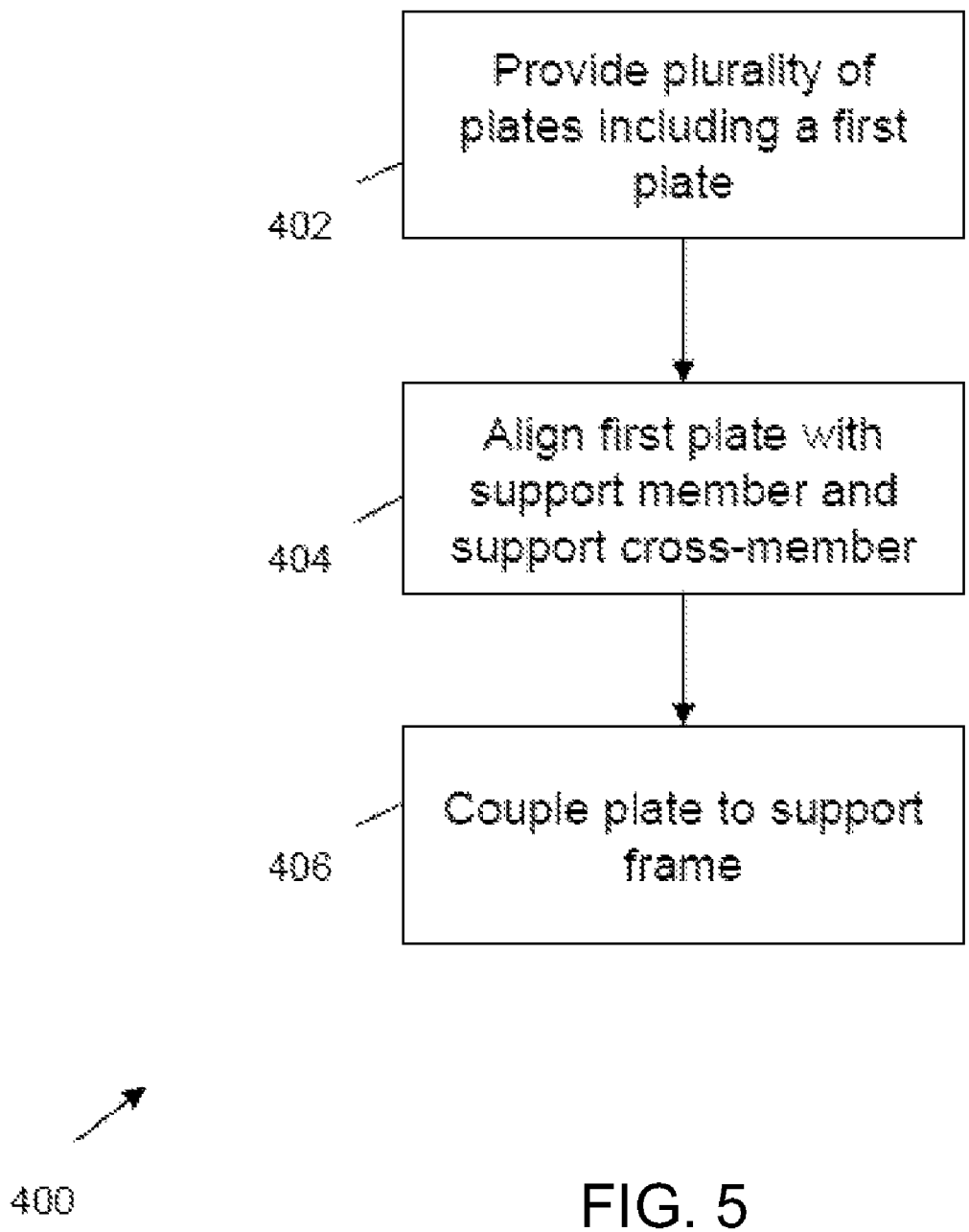
FIG. 5 is a flowchart of an exemplary method for installing the life extension kit shown in FIG. 3.

FIG. 5 is a flow chart of an exemplary method 400 for installing life extension kit 300 onto a portion of generator support frame 46.

In the exemplary embodiment, a plurality of openings (not shown) are suitably provided in generator support frame 46 to enable life extension kit 300 to be coupled to generator support frame 46. More specifically, in the exemplary embodiment, each opening is drilled in support member 56 and/or support cross-member 58 to be suitably positioned with respect to openings 322 of first plate 302, second plate 304, third plate 306, fourth plate 308, fifth plate 310, and/or sixth plate 312.

In the exemplary embodiment, plates 300 are provided 402. Each plate 300 is configured to be coupled to generator support frame 46. In the exemplary embodiment, plate 301 first plate 302, second plate 304, third plate 306, fourth plate 308, fifth plate 310, and/or sixth plate 312 is positioned 404 such that first side 314 is aligned with support member 56 and second side 316 is aligned with support cross-member 58. More specifically, in the exemplary embodiment, first plate 302, second plate 304, third plate 306, fourth plate 308, fifth plate 310, and/or sixth plate 312 is aligned such that openings 322 are suitably positioned with respect to a cooperating opening provided in support member 56 and/or support cross-member 58. Additionally, in the exemplary embodiment, first plate 302, second plate 304, third plate 306, fourth plate 308, fifth plate 310, and/or sixth plate 312 is oriented such that first cutout 318 enables visual inspection of a portion of generator support frame 46, second cutout 320 enables receiving at least one of at least a portion of electric generator 34 and at least a portion of a component coupled to electric generator 34, and/or non-slip surface 324 faces upward.

In the exemplary embodiment, first plate 302, second plate 304, third plate 306, fourth plate 308, fifth plate 310, and/or sixth plate 312 is coupled 406 to generator support frame 46 using a suitable coupling mechanism, such as a bolt. More specifically, in the exemplary embodiment, each opening 322 and each corresponding opening provided in generator support frame 46 receives the suitable coupling mechanism to couple 406 first plate 302, second plate 304, third plate 306, fourth plate 308, fifth plate 310, and/or sixth plate 312 to generator support frame 46. In the exemplary embodiment, first plate 302, second plate 304, third plate 306, fourth plate 308, fifth plate 310, and/or sixth plate 312 is coupled 406 to generator support frame 46 using a bolted joint connection. Alternatively, first plate 302, second plate 304, third plate 306, fourth plate 308, fifth plate 310, and/or sixth plate 312 may be coupled 406 to generator support frame 46 using welds and/or clamps.

Life extension kit 300 extends a useful life of generator support frame 46 by providing additional support to generator support frame 46 and providing an alternative load path for generator support frame 46. Life extension kit 300 reduces vibration induced dynamic stress at joints 54 of generator support frame 46. As such, life extension kit 300 provides a robust structural load-path that reduces frame sensitivity to weld defect, indication, and/or crack propagation for generator support frame 46. Moreover, life extension kit 300 may alter a natural frequency and/or a mode shape of generator support frame 46, thereby increasing a system level vibration margin for generator support frame 46.

Although the methods described and/or illustrated herein are described and/or illustrated herein with respect to a life extension kit for a wind turbine generator support frame for a wind turbine generator, the methods described and/or illustrated herein are not limited to wind turbine generators. Rather, the methods described and/or illustrated are applicable to repairing any suitable apparatus or component.

Exemplary embodiments of the life extension kit and methods for installing the life extension kit onto the generator support frame for the wind turbine generator are described above in detail. The methods and systems are not limited to the specific embodiments described herein, but rather, steps of the methods and components of the systems may be utilized independently and separately from other steps and/or components described herein. For example, the methods and systems described herein may have other industrial and/or consumer applications and are not limited to practice with wind turbines as described herein. Rather, one or more embodiments may be implemented and utilized in connection with other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for installing a modular life extension kit onto a support frame for a wind turbine generator, the support frame including a support member coupled to a support cross-member, the support member having a first length and the support cross-member having a second length, said method comprising:
providing a plurality of plates configured to be coupled to the support frame, wherein at least a first plate of the plurality of plates has a first side extending at least five percent of the first length and a second side extending at least five percent of the second length, and wherein the plurality of plates has a surface area that enables a person to walk on the plurality of plates;
aligning the first side with the support member and the second side with the support cross-member; and,
coupling the first plate to the support frame along the first side and the second side.

2. A method in accordance with claim 1, wherein the support frame has a frame area at least partially defined by the support member and the support cross-member.

3. A method in accordance with claim 1, wherein providing a plurality of plates further comprises providing at least one plate of the plurality of plates that defines at least one cutout having a cutout area that enables visual inspection of a portion of the support frame.

4. A method in accordance with claim 1, wherein providing a plurality of plates further comprises providing at least one plate of the plurality of plates that defines at least one cutout having a cutout area that is configured to receive at least one of at least a portion of the wind turbine generator and a component coupled to the wind turbine generator.

5. A modular life extension kit for use with a support frame for a wind turbine generator, the support frame including at least a support member coupled to a support cross-member, the support member having a first length and the support cross-member having a second length, said modular life extension kit comprising:
a plurality of plates configured to be coupled to the support frame, wherein at least a first plate of said plurality of plates has a first side configured to be coupled to the support member and a second side configured to be coupled to the support cross-member, the first side extending at least five percent of the first length and the second side extending at least five percent of the second length, and wherein said plurality of plates has a surface area that enables a person to walk on said plurality of plates.

6. A modular life extension kit in accordance with claim 5, wherein the support frame has a frame area at least partially defined by the support member and the support cross-member.

7. A modular life extension kit in accordance with claim 5, wherein at least one plate of said plurality of plates defines at least one cutout having a cutout area that enables visual inspection of a portion of the support frame.

8. A modular life extension kit in accordance with claim 7, wherein said first side of said first plate is substantially perpendicular to said second side of said first plate.

9. A modular life extension kit in accordance with claim 5, wherein at least one plate of said plurality of plates defines at least one cutout having a cutout area that is configured to receive at least one of at least a portion of the wind turbine generator and a component coupled to the wind turbine generator.

10. A modular life extension kit in accordance with claim 5, wherein said first plate defines a first plurality of openings along said first side and a second plurality of openings along said second side, each opening of said first and second pluralities of openings configured to receive a suitable coupling mechanism to couple said first plate to the support frame.

11. A modular life extension kit in accordance with claim 5, wherein at least one plate of said plurality of plates has a top surface including a non-slip surface.

12. A modular life extension kit in accordance with claim 5, wherein at least one plate of said plurality of plates has a thickness that is less than the first length of the support member and the second length of the support cross-member.

13. A support system for a wind turbine generator, comprising:
a generator support frame including a support member and a support cross-member coupled to said support member, said support member having a first length and said support cross-member having a second length; and, a modular life extension kit including a plurality of plates configured to be coupled to said generator support frame, wherein at least a first plate of said plurality of plates has a first side configured to be coupled to said support member and a second side configured to be coupled to said support cross-member, said first side extending at least five percent of the first length and said second side extending at least five percent of the second length, and wherein said plurality of plates has a surface area that enables a person to walk on said modular life extension kit.

14. A support system in accordance with claim 13, wherein said generator support frame has a frame area at least partially defined by said support member and said support cross-member.

15. A support system in accordance with claim 13, wherein at least one plate of said plurality of plates defines at least one cutout having a cutout area that enables visual inspection of a portion of said generator support frame.

16. A support system in accordance with claim 13, wherein at least one plate of said plurality of plates defines at least one cutout having a cutout area that is configured to receive at least one of at least a portion of the wind turbine generator and a component coupled to the wind turbine generator.

17. A support system in accordance with claim 13, wherein said first plate defines a first plurality of openings along said first side and a second plurality of openings along said second side, each opening of said first and second pluralities of openings configured to receive a suitable coupling mechanism to couple said first plate to said generator support frame.

18. A support system in accordance with claim 13, wherein at least one plate of said plurality of plates has a top surface including a non-slip surface.

19. A support system in accordance with claim 13, wherein said first side of said first plate is substantially perpendicular to said second side of said first plate.

20. A support system in accordance with claim 13, wherein at least one plate of said plurality of plates has a thickness that is less than the first length of the support member and the second length of the support cross-member.

* * * * *